United States Patent
Kizaki et al.

(10) Patent No.: US 6,804,024 B1
(45) Date of Patent: Oct. 12, 2004

(54) IMAGE FORMING APPARATUS AND IMAGE PROCESSING APPARATUS INCLUDING THE SAME

(75) Inventors: Osamu Kizaki, Saitama (JP); Yoh Masuyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 774 days.

(21) Appl. No.: 09/641,915

(22) Filed: Aug. 21, 2000

(30) Foreign Application Priority Data

Aug. 19, 1999 (JP) .......................................... 11-232898

(51) Int. Cl.[7] .............................................. G06K 15/00
(52) U.S. Cl. ...................... 358/1.18; 358/1.13; 358/450
(58) Field of Search .............................. 358/1.18, 1.13, 358/450, 296, 406, 448, 504, 401; 382/61; 355/218

(56) References Cited

U.S. PATENT DOCUMENTS

| | | | |
|---|---|---|---|
| 5,051,843 A | 9/1991 | Hayashi ...................... 358/450 |
| 5,274,468 A | * 12/1993 | Ojha ........................... 358/448 |
| 5,434,650 A | 7/1995 | Nakahara et al. .............. 399/8 |
| 5,457,543 A | 10/1995 | Maeda ........................ 358/401 |
| 5,485,246 A | 1/1996 | Hayashi et al. ................. 399/1 |
| 5,510,876 A | 4/1996 | Hayashi et al. ................. 399/1 |
| 5,546,164 A | 8/1996 | Hayashi et al. ................. 399/8 |
| 5,583,615 A | 12/1996 | Hashimoto et al. ............. 399/8 |
| 5,694,201 A | 12/1997 | Hayashi et al. ............. 396/109 |
| 5,784,663 A | 7/1998 | Hayashi et al. ................. 399/8 |
| 5,812,900 A | 9/1998 | Hashimoto et al. ............. 399/8 |
| 5,867,279 A | * 2/1999 | Funamizu et al. ........... 358/296 |
| 5,897,236 A | 4/1999 | Hashimoto et al. ............. 399/8 |
| 5,915,156 A | 6/1999 | Kizaki et al. ................ 399/436 |
| 5,966,564 A | 10/1999 | Kizaki et al. ................ 399/101 |
| 6,026,255 A | 2/2000 | Kizaki et al. ................. 399/43 |
| 6,122,457 A | 9/2000 | Kizaki .......................... 399/11 |

FOREIGN PATENT DOCUMENTS

| | | |
|---|---|---|
| JP | 7-203121 | 8/1995 |
| JP | 10-42127 | 2/1998 |

* cited by examiner

Primary Examiner—Twyler Lamb
(74) Attorney, Agent, or Firm—Oblon, Spivak, McClelland, Maier & Neustadt, P.C.

(57) ABSTRACT

An image forming apparatus capable of printing a plurality of paginated original image information on a single paper sheet. The apparatus includes an image data generating device for generating, based on the original image information, integrated image data to be integrated into a single page. The image data generating device includes a division designating section for designating any one of images represented by the original image information as an image indicative of a division between chapters. The image designated by the division designating section is arranged in a particular image region in an integrated image page. The apparatus can therefore implement an integrated copy plus division mode not available with conventional image forming apparatuses. An image processing apparatus includes the above image forming apparatus.

36 Claims, 15 Drawing Sheets

FIG. 19

| Img1 | Img2 |
|---|---|
| Img3 | Img4 |

| Img5 | Img6 |
|---|---|
|  |  |

FIG. 20

| Img1 | Img2 |
|---|---|
| Img3 | BLANK |

| Img4 | Img5 |
|---|---|
| Img6 |  |

IMAGE FORMING APPARATUS AND IMAGE PROCESSING APPARATUS INCLUDING THE SAME

BACKGROUND OF THE INVENTION

The present invention relates to an image forming apparatus and more particularly to an image forming apparatus capable of integrating a plurality of image data on a single paper sheet, and a copier, printer, facsimile apparatus, electronic file, which is capable of integrating or otherwise editing a plurality of images, or similar image processing apparatus including the same.

An advanced digital copier or printer, for example, has an integrating function or so-called N-in-1 function for integrating a plurality of image data on a single paper sheet. The integrating function allows a person to see all of a plurality of individual images printed on a single paper. The integral function, however, has some problems left unsolved. For example, a person, looking at the integrated images, is apt to fail to instantaneously determine the page heading the images or the direction in which the pages advance. In light of this, there has been proposed the following schemes (1) and (2):

(1) To make the integrated images readable, solid lines, dashed lines, dash-and-dot lines or similar lines are inserted between nearby images when the images are printed on a paper sheet; and (2) To allow a person to readily see heading one of pages integrated in a single page by the N-in-1 function as well as the order of pages, extra image data representative of the order of pages and head page are added to image data representative of the successive pages to be integrated.

The scheme (2) allows a person to see the position of a head page in a single integrated printing and the order of pages. The scheme (2), however, deals with all of the page images other than the head page image in exactly the same manner during integration. Consequently, even when the successive pages include, e.g., a division between chapters, the scheme (2) does not identify the division. As a result, a long period of time is necessary for a person to find an image indicative of a division between chapters. This is undesirable from the image search standpoint.

A division mode for allowing a person to see a division between chapters is available with, e.g., a copier. In the division mode, it has been customary to feed an extra paper sheet from a particular paper feed stage at the time of copying meant for a document number at which a new chapter should begin. However, the division mode and integration mode are contrary to each other as to a method of implementing the function (printing a designated image on the extra sheet). For this reason, these two different modes have heretofore been inhibited from being combined. The only way available for a person to see a division in integrated images is to recognize the contents of the images. Moreover, as the number of integrated images increases, the individual image becomes smaller in size. Such images would be more difficult to read and see a division between chapters.

In the conventional integration mode, a blank document may be inserted between documents so as to position a designated image indicative of a division between chapters on a desired integrated paper sheet. This, however, forces the operator to remove the blank document after a job and thereby renders the operation troublesome and inefficient.

Neither one of the conventional schemes (1) and (2) pays attention to the above-described problems relating to the integrating function.

Technologies relating to the present invention are disclosed in, e.g., Japanese Patent Laid-Open Publication Nos. 7-203121 and 10-42127.

SUMMARY OF THE INVENTION

It is therefore an object of the present invention to provide an image forming apparatus capable of laying out, in the integration mode, document images such that a person can easily identify a division between chapters, and an image processing apparatus including the same.

In accordance with the present invention, in an image forming apparatus including an image data generating device for generating, based on a plurality of paginated original image information, integrated image data to be integrated into a single page, the image data generating device includes a division designating section for designating any one of images represented by the original image information as an image indicative of a division between chapters. The image designated by the division designating section is arranged in a particular image region in an integrated image page.

Also, in accordance with the present invention, an image processing apparatus includes an inputting device for inputting a plurality of paginated original image information, and an image forming apparatus including an image data generating device for generating, based on the original image information, integrated image data to be integrated into a single page. The image data generating device includes a division designating section for designating any one of images represented by the original image information as an image indicative of a division between chapters. The image designated by the division designating section is arranged in a particular image region in an integrated image page.

BRIEF DESCRIPTION OF THE DRAWINGS

The above and other objects, features and advantages of the present invention will become more apparent from the following detailed description taken with the accompanying drawings in which:

FIG. 19 is a view showing the images Img1 through Img6 integrated by a conventional scheme; and FIG. 20 is a view showing the pictures Img1 through Img6 integrated by an integrated copy plus division mode unique to the illustrative embodiment.

DESCRIPTION OF THE PREFERRED EMBODIMENT

Figure 1:
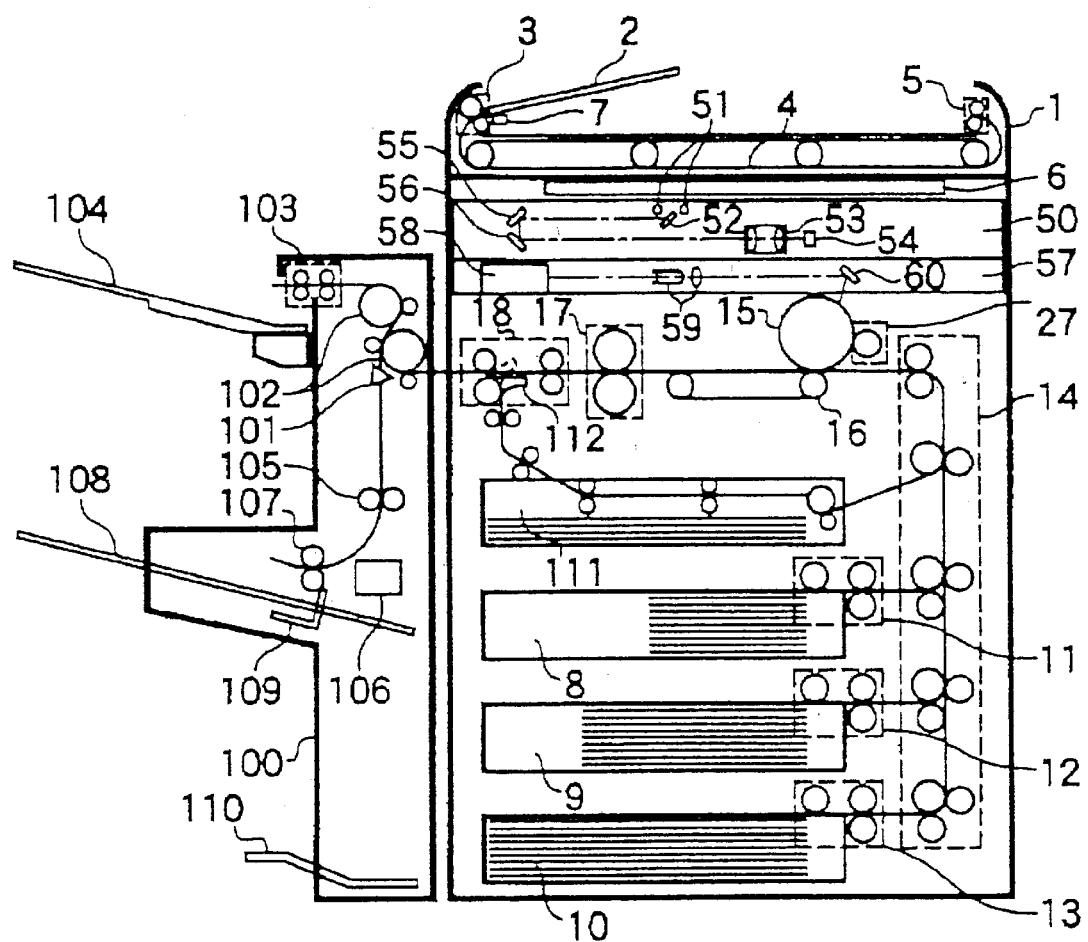
FIG. 1 is a view showing the general construction of an image processing apparatus embodying the present invention and implemented as a copier by way of example.

Referring to FIG. 1 of the drawings, a copier with an image forming apparatus embodying the present invention is shown. As shown, the copier includes an ADF (Automatic Document Feeder) 1 having a tray 2. Documents 2 are stacked on the tray 2 face up, i.e., with image surfaces thereof facing upward. An operation panel 30 (see FIG. 2) includes a start key 34. When the operator of the copier presses the start key 34, a pickup roller 3 and a belt 4 sequentially convey the bottom document 2 to the top document 2 to a preselected position on a glass platen 6. A scanning unit 50 reads image data out of the document 2 positioned on the glass platen 6. Subsequently, the belt 4 and an outlet roller 5 discharge the document 2 read by the scanning unit 50. As a document sensor 7 senses the next document 2 on the tray 2, the document 2 is conveyed to the glass platen 6 in the same manner as the previous document 2. A motor, not shown, drives the pickup roller 3, belt 4, and outlet roller 5.

A writing unit 57 includes a laser and controls a laser beam issuing from the laser in accordance with data derived from the image data output from the scanning unit 50. As a result, a latent image is electrostatically formed on a photoconductive element implemented as a drum 15. When the drum 15 in rotation brings the latent image to a developing unit 27, the developing unit 27 develops the latent image with toner to thereby form a corresponding toner image. A belt 16 conveys a paper sheet at a speed equal to the rotation speed of the drum 15, so that the toner image is transferred from the drum 15 to the paper sheet.

More specifically, a first to a third paper tray 8 to 10, respectively, each are loaded with a stack of paper sheets. A first to a third paper feeder 11 to 13, respectively, are associated with the first to third paper trays 8 to 10, respectively. When any one of the paper feeders 11 through 13 feeds a paper sheet from associated one of the paper trays 8 through 10, a vertical conveying unit 14 conveys the paper sheet to a position where the paper sheet contacts the drum 15. A fixing unit 17 fixes a toner image formed on the paper sheet in the previously stated manner. A paper discharging unit 18 discharges the paper sheet coming out of the fixing unit 17 to a finisher 100.

The finisher 100 selectively steers the paper sheet toward a discharge roller 102 or toward a stapling section with a path selector 101. Specifically, the path selector 101 steers the paper sheet toward a usual copy tray 104 via the discharge roller 102 and outlet rollers 103 when positioned upward or steers it toward a staple tray 108 via rollers 105 and 107 when positioned downward.

Every time a paper sheet is conveyed to the staple tray 108, a jogger 109 positions it on the tray 108. As soon as a complete set of paper sheets constituting a single copy is stacked on the staple tray 108, a stapler 106 staples them. The resulting stapled stack is laid on a stapled copy tray 110 due to its own weight. The usual copy tray 104 is movable back and forth in order to sort, in a simple manner, paper sheets on a document basis or on the basis of a copy sorted by an image memory.

In a duplex copy mode, as distinguished from a simplex copy mode, a path selector 112 is positioned upward. In this position, the path selector 112 does not steer paper sheets fed from any one of the paper trays 8 through 10 and each carrying a toner image on one side thereof toward the copy tray 104, but steers them toward a duplex copy unit 111. As a result, such paper sheets are sequentially stacked on the duplex copy unit 111. The paper sheets are then sequentially fed from the duplex copy unit 111 in order to transfer a toner image from the drum 15 to the other side of each paper sheet. At this instant, the path selector 112 is positioned downward in order to steer the paper sheets carrying images on both sides thereof, i.e., duplex copy sheets toward the copy tray 104.

A main motor, not shown, drives the drum 15, belt 16, fixing unit 17, paper discharging unit 18, and developing unit 27. The output torque of the main motor is transferred to each of the paper feeders 11 through 13 via a particular paper feed clutch, not shown, and transferred to the vertical conveying unit 14 via an intermediate clutch not shown.

Figure 2:
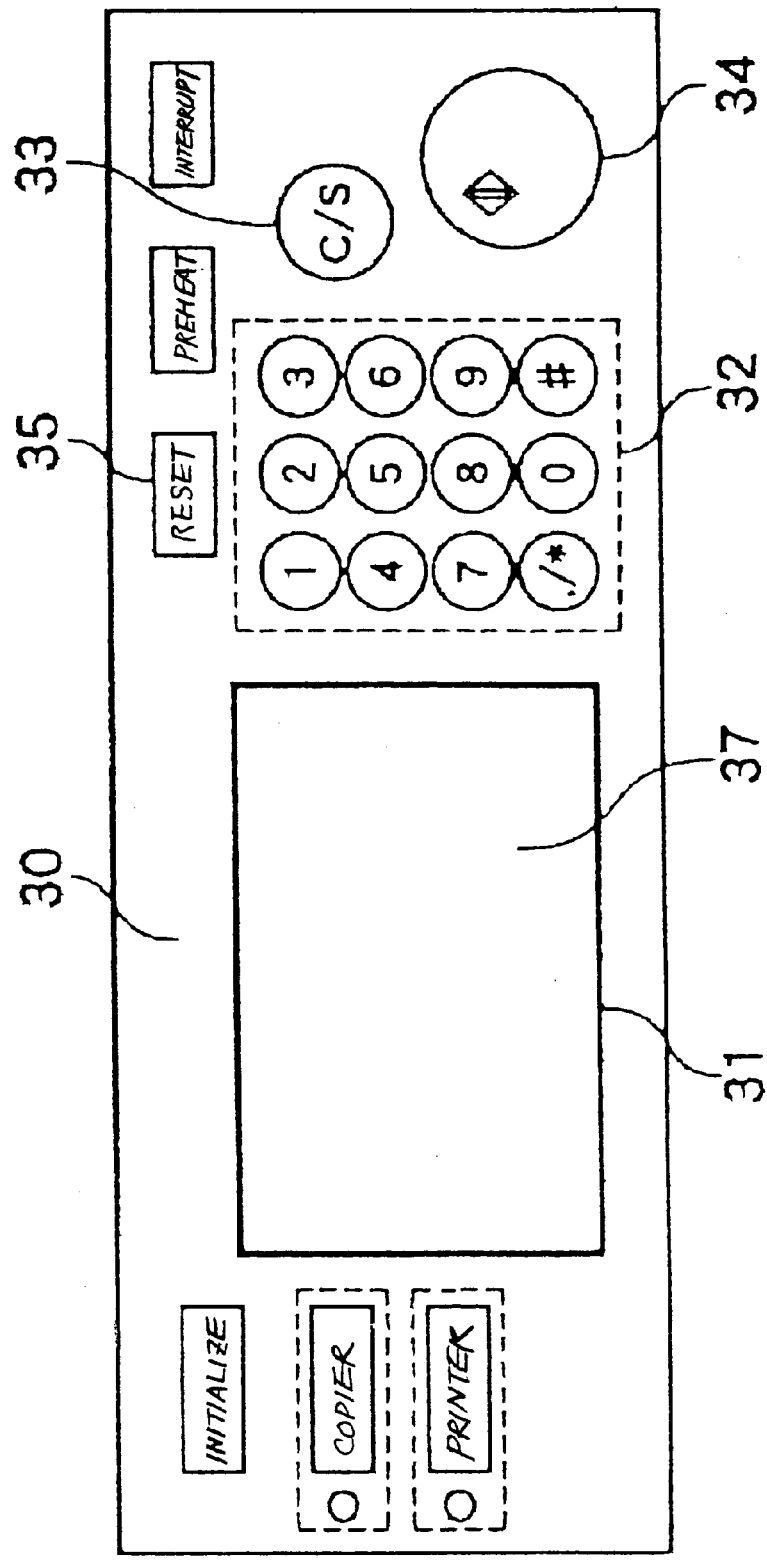
FIG. 2 is a view showing a specific configuration of an operation panel included in the illustrative embodiment.
Figure 3:
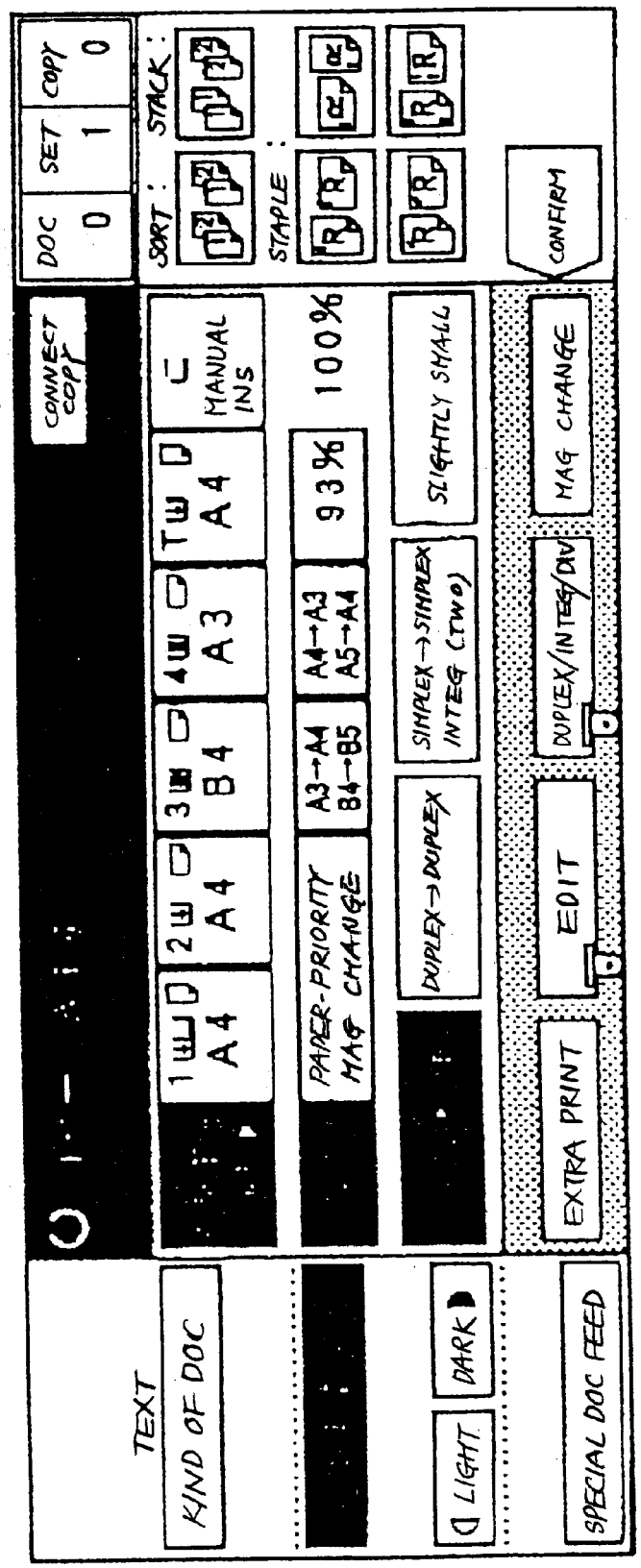
FIG. 3 is a view showing a specific picture to appear on an LC (Liquid Crystal) touch panel for allowing the operator of the copier to input desired copy modes.

FIG. 2 shows a specific configuration of the operation panel 30 while FIG. 3 shows a specific picture appearing on a LC touch panel 31 arranged on the operation panel 30. As shown in FIG. 2, the operation panel 30 includes numeral keys 32, a clear/stop (C/S) key 33, a print key 34 and a mode clear (Reset) key 35 in addition to the touch panel 31. The touch panel 31 displays various function keys 37 and messages indicative of the number of copies (complete sets of paper sheets), the statuses of the copier and so forth.

When the operator touches a desired key appearing on the touch panel 31, the key is highlighted in black. Further, when the operator touches a key assigned to a desired function for inputting details of the function, e.g., a magnification, a picture allowing the operator to input the details appears in place of the picture shown in FIG. 3. In this manner, with the touch panel 31, it is possible to graphically effect optimal display because the touch panel 31 uses a dot display.

In the specific picture shown in FIG. 3, a message area for displaying, e.g., "Ready to copy" or "Wait" appears at the top left position. There also appear in the picture the number of copies input by the operator, an automatic density key for automatically controlling image density, an automatic paper selection key for automatically selecting paper sheets, a sort key for sorting copy sheets in order of page copy by copy, a stack key for stacking copy sheets page by page, staple keys for stapling a stack of sorted copy sheets, a x1 magnification key, a duplex copy key for selecting the duplex copy mode, and an extra print key for setting a stamp, a date, pages and so forth to be printed. Keys assigned to modes selected are indicated by hatching in the picture.

Referring again to FIG. 1, how the copier forms a latent image on the drum 15 will be described more specifically. This function is mainly assigned to the scanning unit 50 and writing unit 57. The scanning unit 50 includes scanning optics in addition to the glass. platen 6. The scanning optics includes lamps 51, a first mirror 52, a lens 53, and a CCD (Charge Coupled Device) image sensor 54. The lamp 51 and first mirror 52 are mounted on a first carriage, not shown, while a second and a third mirror 55 and 56, respectively, are mounted on a second carriage not shown. The first and second carriages are mechanically moved at a relative speed of 2:1 while scanning a document in order to maintain the length of an optical path constant. A scanner motor, not shown, drives the optics. The CCD image sensor 54 reads a document image and transforms it to an electric signal. The lens 53 and image sensor 54 are movable in the right-and-left direction in FIG. 1 in order to vary the magnification, as desired. That is, the positions of the lens 53 and image sensor 54 in the above direction are set in accordance with a desired magnification.

The writing unit 57 includes a laser output unit 58, a lens 59, and a mirror 60. The laser output unit 58 accommodates a laser diode and a polygonal mirror that is rotated by a motor, not shown, at a preselected high speed. A laser beam issuing from the laser diode in accordance with the image data is steered by the polygonal mirror and then focused on the drum 15 via the lens 59 and mirror 60. The laser beam scans the surface of the drum 15 in the main scanning direction perpendicular to the subscanning direction in which the drum 15 rotates. As a result, a latent image is formed on the drum 15 line by line in accordance with an image signal output from a selector 64 (see FIG. 4), which will be described specifically later. More specifically, the laser beam repeatedly scans the drum 15 at a preselected period corresponding to the rotation speed of the drum 15 and recording density. A latent image refers to a potential distribution formed on the drum 15 on the basis of optical information derived from a document image.

The laser beam is incident not only to the drum 15 but also to a beam sensor, not shown, during main scanning. The beam sensor is positioned in the vicinity of one end of the drum 15 and generates a main-scan synchronizing signal when the laser beam illuminates it. The main-scan synchronizing signal is used to control a record start timing in the main scanning direction and to generate control signals for inputting and outputting an image signal, which will be described later.

Figure 4:
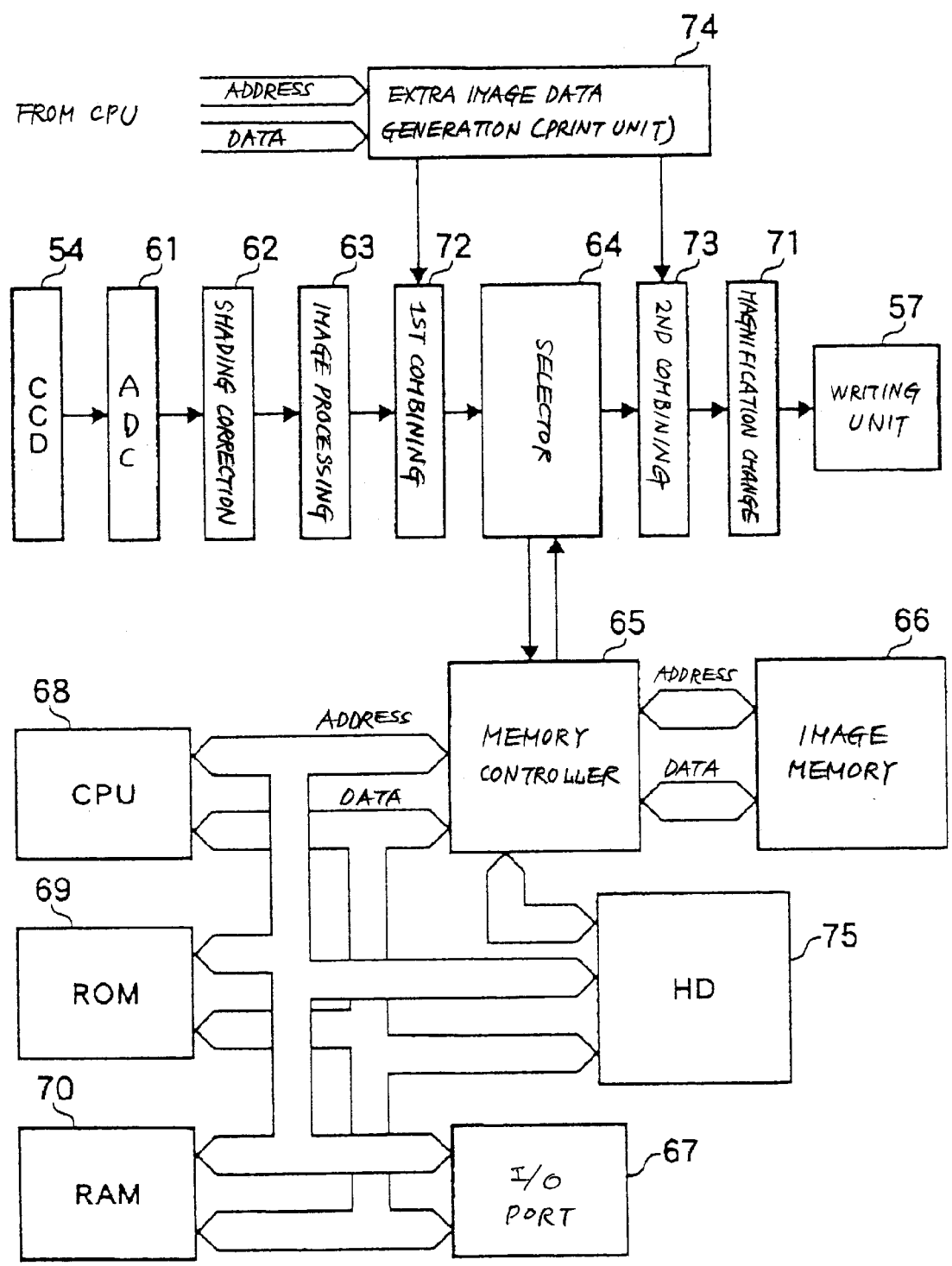
FIG. 4 is a block diagram schematically showing a specific configuration of an image processing unit (IPU) included in the illustrative embodiment.

A procedure for generating image data to be input to the writing unit 57 on the basis of an image signal output from the scanning unit 50 will be described hereinafter. This function is assigned mainly to an image processing unit (IPU). FIG. 4 shows a specific configuration of the IPU. It is to be noted that addresses and data shown in FIG. 4 pertain to image data; data and addresses connected to a CPU (Central Processing Unit) 68 are not shown.

As shown in FIG. 4, when the lamp 51 illuminates the document, the resulting reflection is incident to the CCD image sensor 54. The image sensor 54 transforms the incident light to an electric signal. An ADC (Analog-to-Digital Converter) 61 converts the electric signal to a corresponding digital image signal. A shading correction 62 executes shading correction with the digital image signal. An image processing 63 executes MTF (Modulation Transfer Function) and gamma correction with the image signal subjected to shading correction. A selector 64 selectively delivers the corrected image signal to a magnification change 71 or a memory controller 65. The magnification change 71 enlarges or reduces the image signal in accordance with a magnification change ratio and feeds the resulting image signal to the writing unit 57.

The selector 64 and memory controller 65 are capable of interchanging image signals with each other. The memory controller 65 writes the document image in an image memory or any other storage, reads the document image out of the image memory, and delivers it to the writing unit 57 via the selector 64. Specifically, the CPU 68 mentioned earlier sets operating conditions in the memory controller 65 and controls the scanning unit 50 and writing unit 57. A ROM (Read Only Memory) 69 and a RAM (Random Access Memory) 70 store a program and data to be dealt with by the CPU 68. In the illustrative embodiment, the CPU 68 causes data to be written and read out of an image memory 66 or out of a hard disk (HD) 75, which is a specific form of a mass storage, via the memory controller 65.

The memory controller 65 includes a compressing device although not shown specifically. The compressing device compresses the image data input to the memory controller 65 via the selector 64. The compressed image data are written to the image memory 66. When the compressed image data should be sequentially stored for a moment, they are transferred from the image memory 66 to the HD 75, as will be described specifically later.

Why the memory controller 65 compresses the image data before writing them in the image memory 66 will be described hereinafter. Although 256-gradataion data corresponding to the maximum image size can be directly written to the image memory 66, the memory capacity required to store a single document image is excessively large. In this sense, compressing the image data is successful to effectively use the limited capacity of the image memory 66. Further, because the image memory 66 is capable of storing a great number of document image data at a time, the data can be read out of the image memory 66 in order of page. That is, a sorting function is available with the image memory 66.

An expanding device, not shown, is also included in the memory controller 65 and sequentially expands the document image data read out of the image memory 66. This function is generally referred to an electronic sorting function. The document image data written to the HD 75 are read out, transferred to the image memory 66, and expanded in the same manner as the above document image data.

With the image memory 66, it is also possible to divide the area of the image memory 66 corresponding to a single paper sheet and sequentially write a plurality of document images in the divided portions. For example, when the above area of the image memory 66 is divided into four subareas, four document images can be sequentially written to the four subareas. The four document images can therefore be reproduced on a single paper sheet together in the form of an integrated copy.

An extra image data generation (print unit) 74 is connected to a CPU bus for generating extra image data representative of, e.g., dates (characters), pages (characters), and desired stamps. The extra image data are selectively input to a first combining 72 or a second combining 73, so that desired extra images can be combined with document images output from the image processing 72 or read out of the memory. Specifically, the first combining 72 is capable of combining the extra images with the images read by the scanning unit 50 while the second combining 73 is capable of combining them with the images read out of the memory. The extra image data generation 74 additionally has a position control function, i.e., sets the position of an image, which is read out of the memory (image memory 66 or HD 75), where the extra image data should be inserted.

Figure 5:
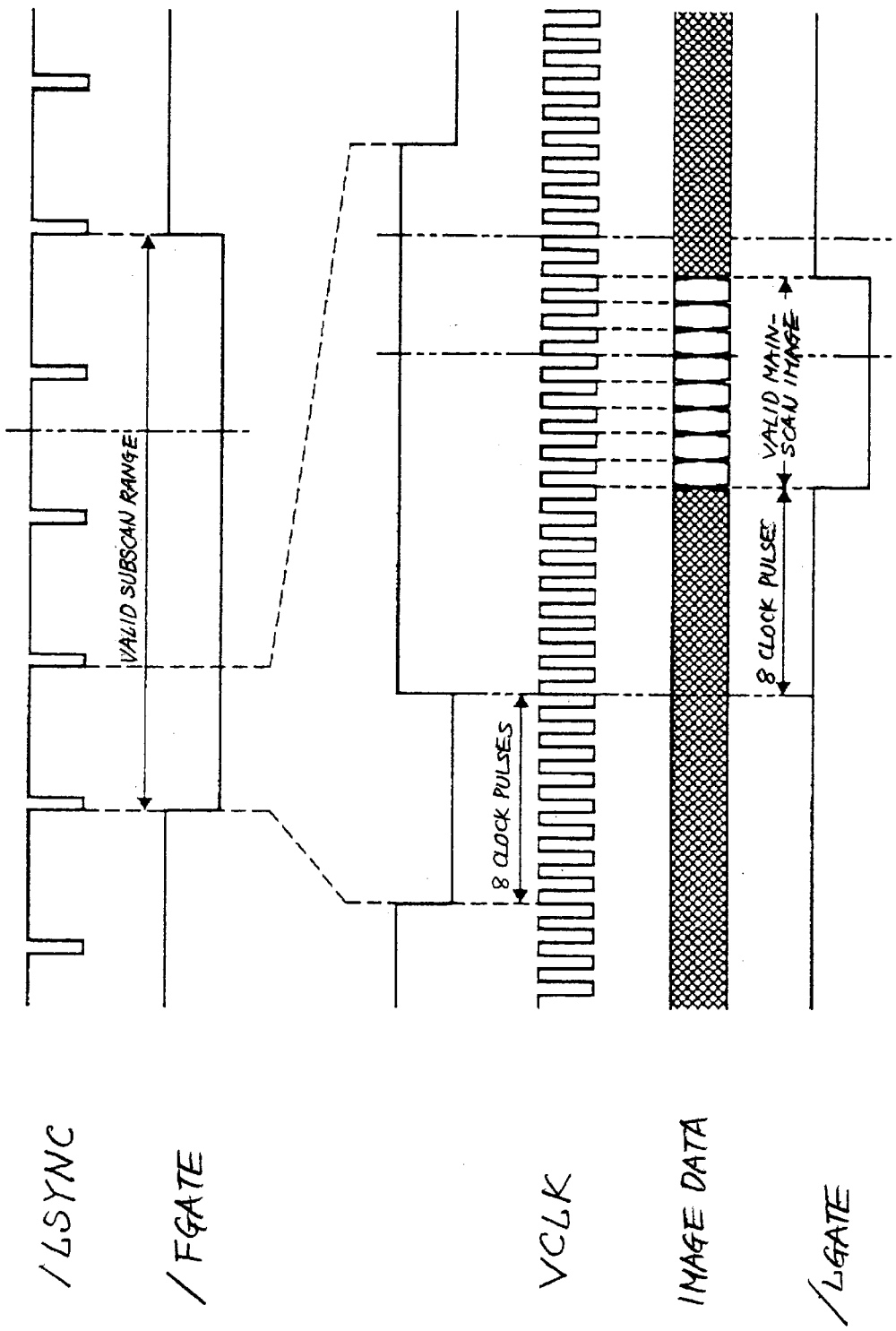
FIG. 5 is a timing chart showing control signals for causing a selector included in the IPU to combine one page of image signals.

FIG. 5 shows various control signals that the IPU, FIG. 4, generates for combining one page of image signals at the selector 64. As shown, a frame gate signal /FGATE defines a valid period for one page of image data in the subscanning direction. A line-by-line main-scan synchronizing signal /LSYNC allows an image signal to become valid on the appearance of a preselected number of pixel clock pulses VCLK after the signal /LSYNC has gone high. A signal /LGATE shows that an image signal in the horizontal direction is valid. The signals /FGATE, /LSYNC and /LGATE are synchronous to the pixel clock, or pixel period signal, VCLK. A single pixel data is fed for a single period of the pixel clock /VCLK. The IPU generates particular signals /FGATE, /LSYNC, /LGATE and VCLK for each of the input and output of an image, implementing image input and image output in various combinations.

Figure 6:
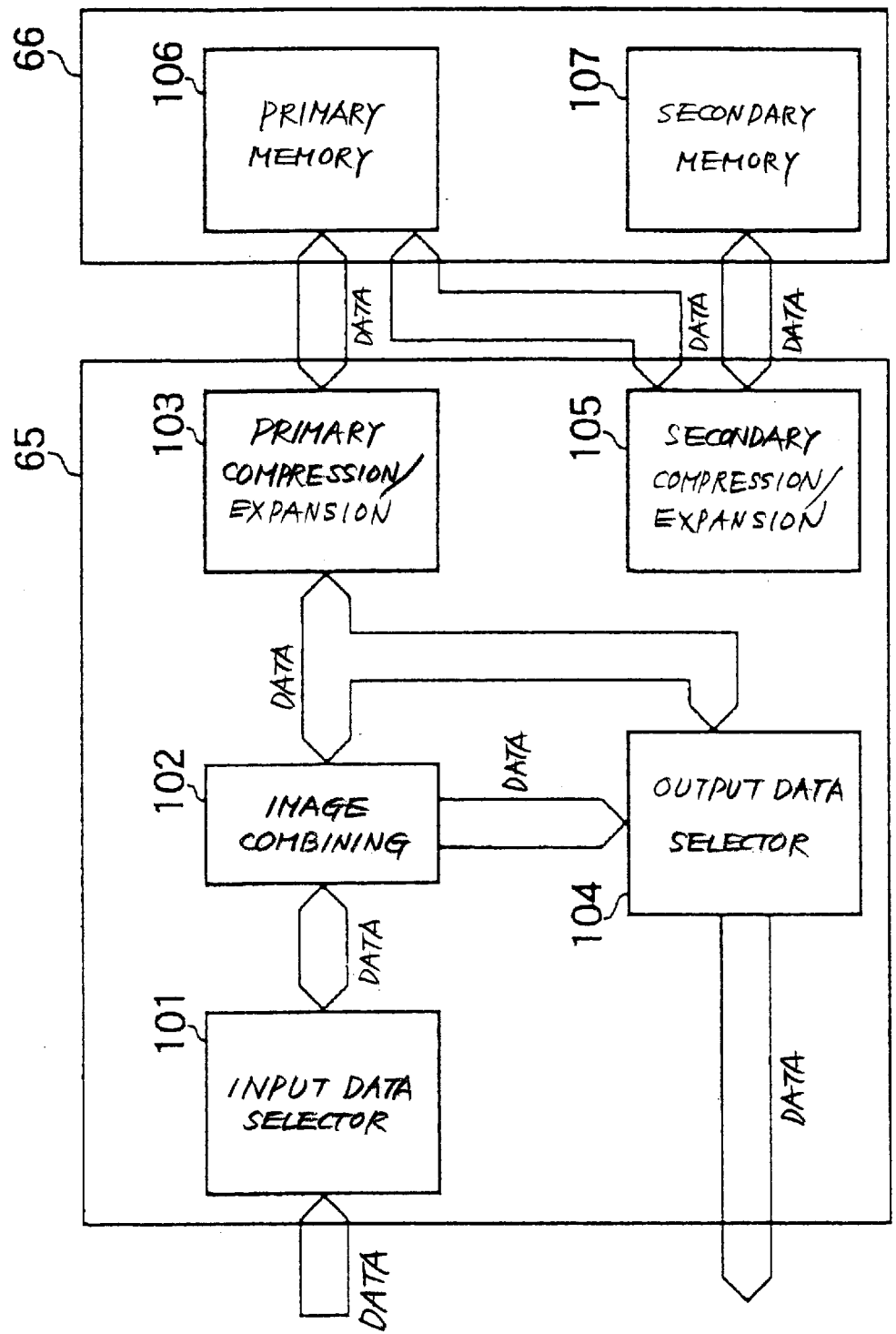
FIG. 6 is a schematic block diagram showing a specific configuration of a memory controller and an image memory shown in FIG. 4.

A specific configuration of the memory controller 65 and image memory 66 will be described with reference to FIG. 6. As shown, the memory controller 65 is made up of an input data selector 101, an image combining 102, a primary compression/expansion 103, an output data selector 104, and a secondary compression/expansion 105. The CPU 68, FIG. 4, sends various control data to the blocks 101 through 105.

The image memory 66 has a primary and a secondary memory 106 and 107, respectively. The primary memory 106 allows data to be written thereto substantially in synchronism with the transfer rate of input image data or allows them to be read thereoutof at a high speed. For this purpose, the memory 106 is implemented by a DRAM (Dynamic RAM) or similar high-speed access memory. Further, the interface of the memory 106, which interfaces the memory 106 to the memory controller 65, is configured to allow the area of the memory 106 to be divided into a plurality of subareas in accordance with the size of image data to be processed. In this configuration, image data can be written to and read out of the memory 106 at the same time. More specifically, the interface is connected to the memory controller 65 by two address/data lines respectively assigned to reading and writing, so that image data can be written to and read out of the subareas in parallel. For example, while an image is written to one subarea, an image can be read out of another subarea.

The secondary memory 107 is a mass storage and stores data for combining or sorting input images. Both the primary and secondary memories 106 and 107 may be implemented by high-speed access memories in order to deal with data in the same manner as each other for a simple control purpose. However, such memories, e.g., DRAMs are expensive. In the illustrative embodiment, the secondary memory 107 is implemented by an inexpensive, mass recording medium, whose access speed is relatively low, and deals with the image data via the primary memory 106.

With the above-described memory configuration, it is possible to construct an inexpensive, relatively simple device capable of inputting, outputting, storing and editing a large amount of image data.

The memory controller 65 with the configuration shown in FIG. 6 operates as follows. First, at the time of image input, the input data selector 101 selects image data to be written to the image memory 66 (primary memory 106) out of the plurality of different image data input thereto. The image combining 102 combines the image data selected by the input data selector 101 and the data existing in the image memory 66. The primary compression/expansion 103 compresses the image data output from the image combining 102 and writes the compressed data in the primary memory 106. The second compression/expansion 105 further compresses the data written to the primary memory 106 and then writes them in the secondary memory 107, if necessary.

At the time of image output, assume that an image to be output exists in the primary memory 106. Then, the primary compression/expansion 103 expands the image data read out of the primary memory 106. The output data selector 104 selects and outputs the expanded data or the combination of the expanded data and input data. The image combining 102 has a function of adjusting the phases of image data and combines the data read out of the primary memory 106 and the input data. The image combining 102 then selects the destination of the combined data, i.e., inputs the data to the output data selector 104 or again writes the data in the primary memory 106 or inputs them to both of the output data selector 104 and primary memory 106.

If the image to be output is absent in the primary memory 106, the secondary compression/expansion 105 expands subject image data read out of the secondary memory 107 and writes the expanded data in the primary memory 106. This is also followed by the above-described procedure.

How the copier pastes image data in an integrated copy mode will be described hereinafter. When images read via the CCD image sensor 54, FIG. 4, or images read out of, e.g., the HD 75 are to be written to the image memory 66, the memory controller 65, FIG. 4, designates coordinates, or write start addresses, image by image.

Figure 7:
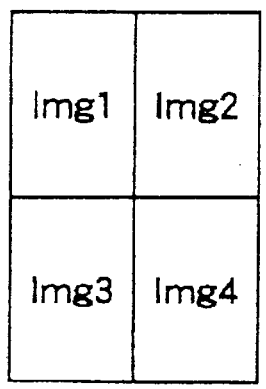
FIG. 7 is a view showing a specific copy in which four images are integrated into a single image.
Figure 8:
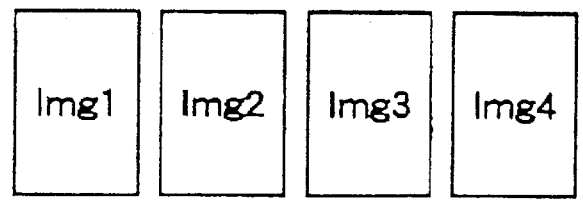
FIG. 8 is a view showing the individual images to be integrated as shown in FIG. 7.
Figure 9:
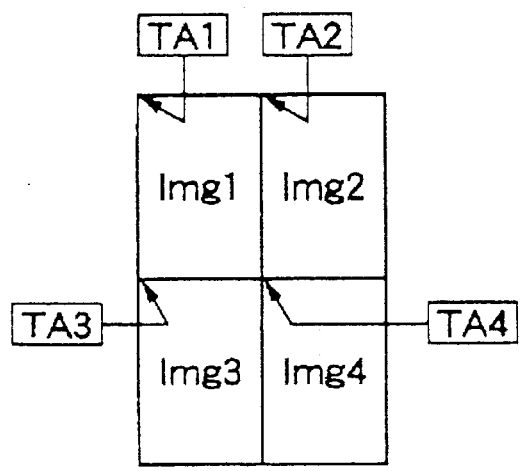
FIG. 9 is a view showing the images of FIG. 8 each being pasted with a particular write start address assigned thereto and integrated.
Figure 10:
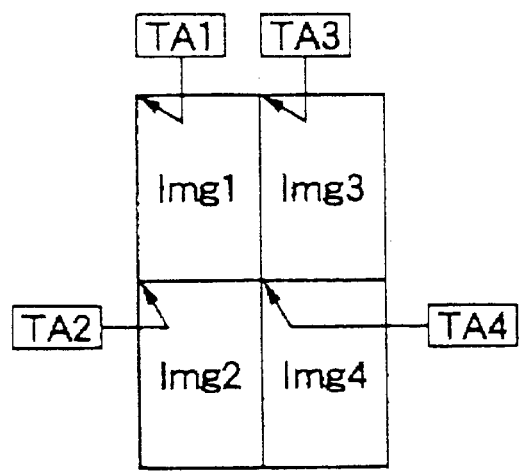
FIG. 10 is a view different from FIG. 9 except for the write start addresses.

FIG. 7 shows a specific copy of four images Img1 through Img4 integrated into a single image on a paper sheet. FIG. 8 shows the images Img1 through Img4 not integrated together. Further, FIGS. 9 and 10 each show a particular page image in which the images Img1 through Img4 are integrated with write start address TA1 through TA4 being assigned thereto.

Specifically, the images Img1 through Img4 shown in FIG. 8 are read out of the image memory 66. Subsequently, image data for arranging the images Img1 through Img4 on a paper sheet are written to the image memory 66 with particular one of the write start addresses TA1 through TA4 being assigned to each image. More specifically, image data representative of the images Img1 through Img4 are respectively written to the addresses TA1 through TA4 of the image memory 66 and integrated thereby. The specific page images shown in FIGS. 9 and 10 differ from each other as to the positions of the Img2 and Img3, i.e., the coordinates of the start addresses TA2 and TA3.

Figure 11:
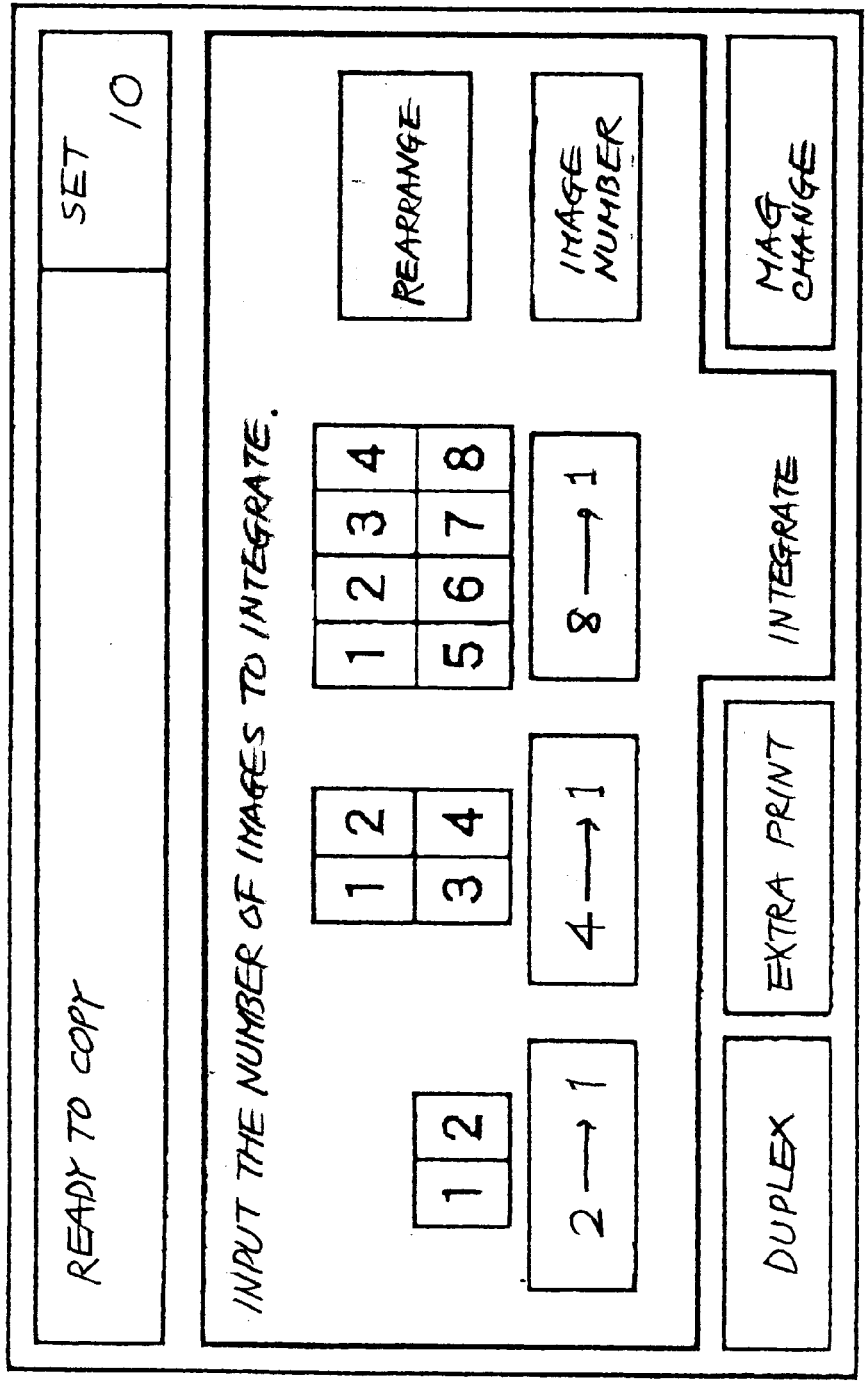
FIGS. 11 and 12 are views each showing a particular picture to appear on the touch panel in an integration copy mode.
Figure 12:
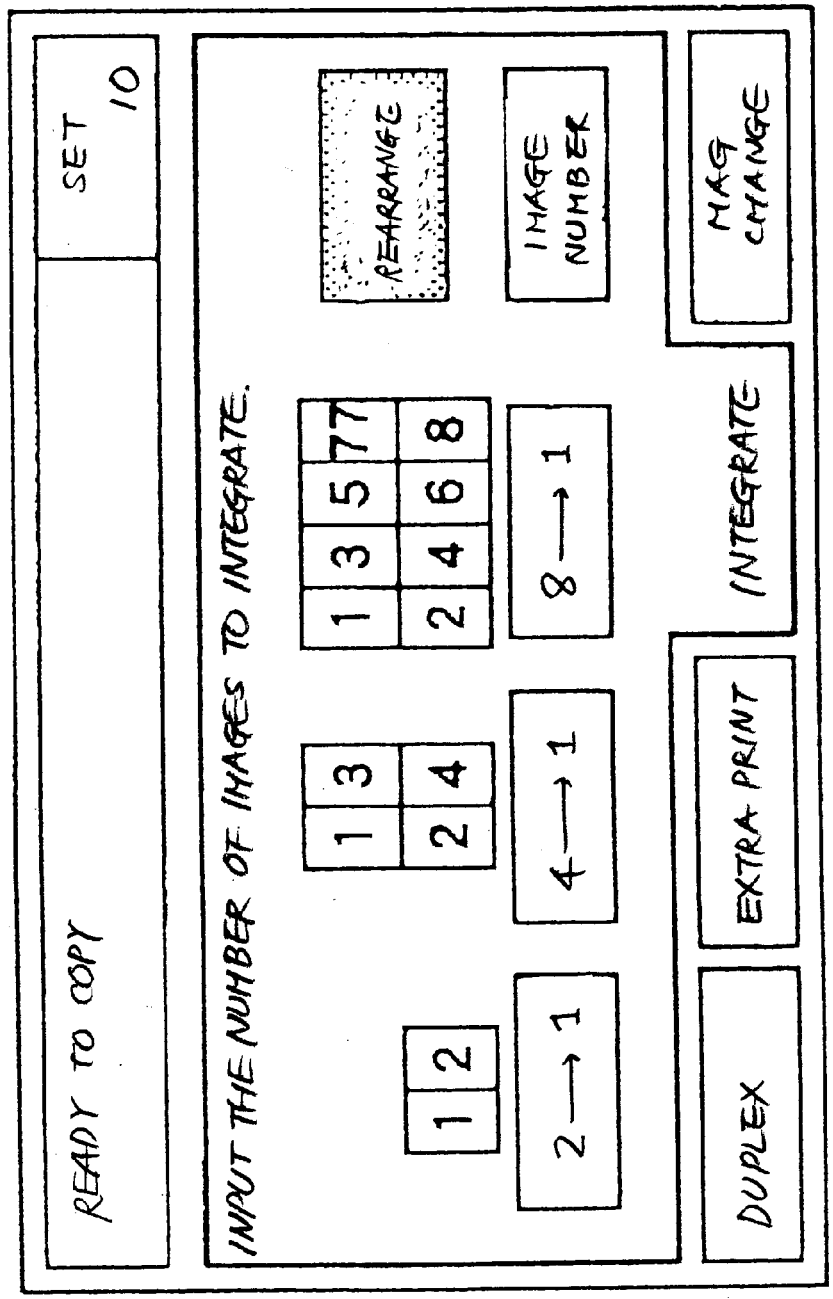
Figure 13:
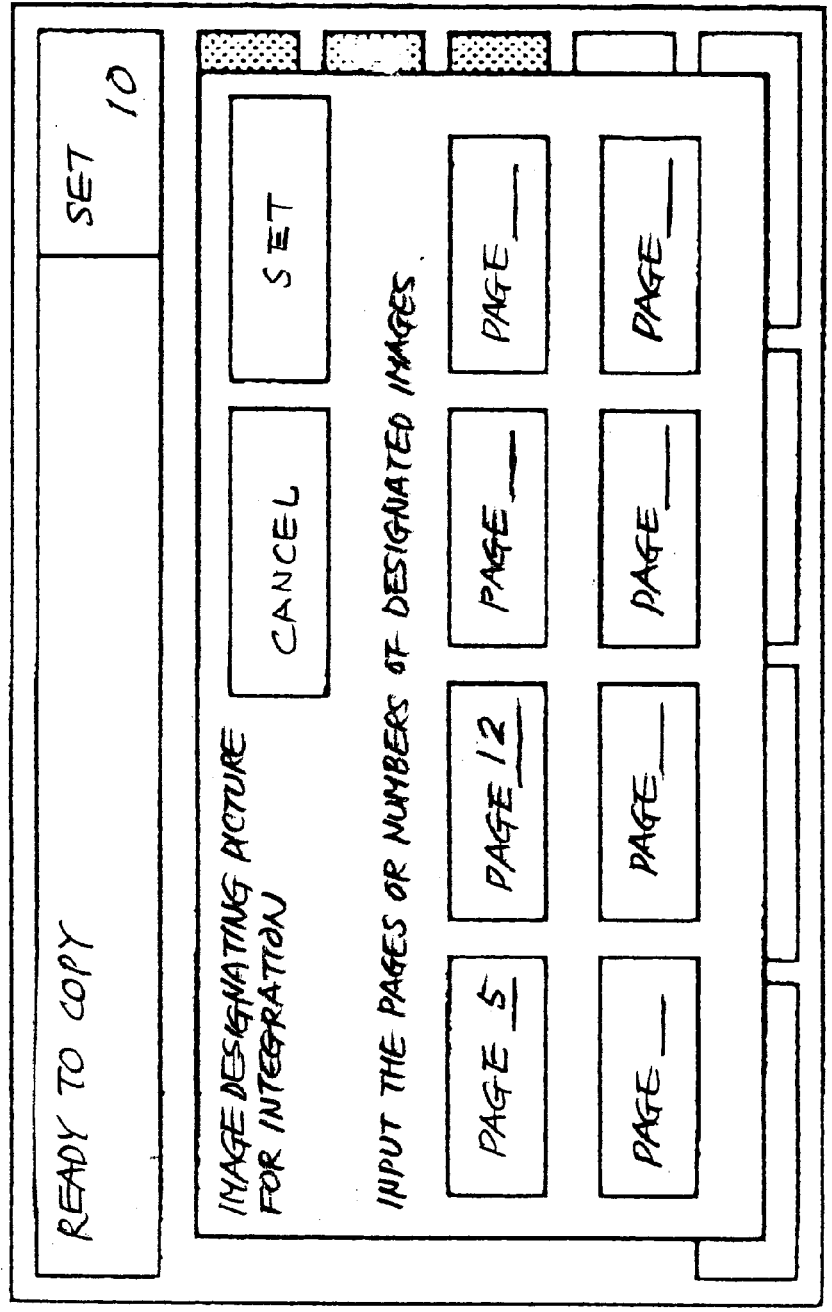
FIG. 13 is a view showing a specific picture to appear on the touch panel in an integrated copy plus division mode.

FIGS. 11 through 13 show pictures sequentially appearing on the operation panel 30, FIG. 2, when the operator selects the integrated copy mode. Specifically, FIGS. 11 and 12 each show particular positions in which image data are pasted. To replace the pasting positions of FIG. 11 with the pasting position of FIG. 12 (identical with the positions of FIG. 10), the operator touches a rearrange key included in the picture of FIG. 11 so as to change the write start addresses TA1 through TA4, as stated earlier.

Further, the operator, watching the touch panel 30, is capable of designating a desired page in order to indicate a division between chapters. Specifically, when the operator touches an image number key included in the picture of FIG. 11 or 12, a specific picture shown in FIG. 13 appears. The operator, watching the picture of FIG. 13, inputs the page number of an image that should indicate a division between chapters during integrating operation, and then sets it on a set key. The above-mentioned page number refers to the number of documents or an image number assigned to one of a group of images stored in the memory.

Figure 14:
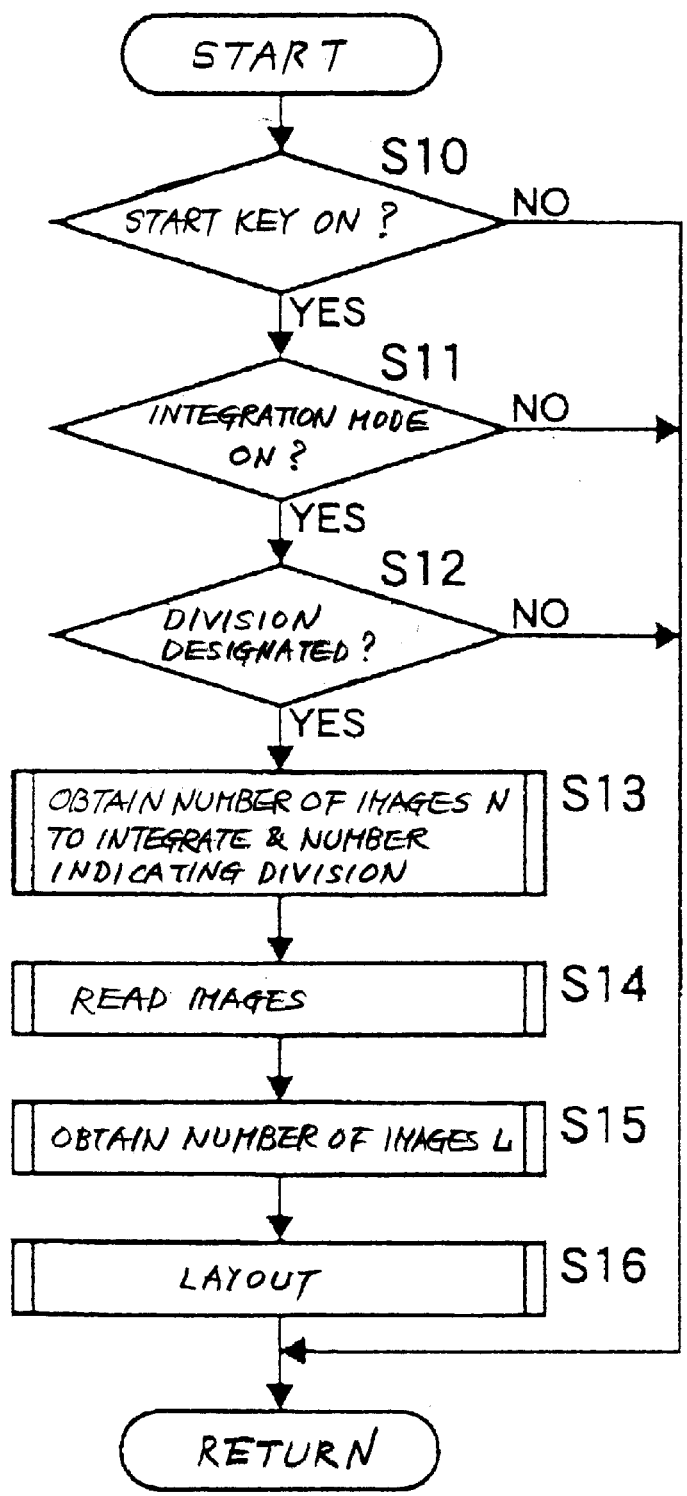
FIGS. 14 through 17 are flowcharts demonstrating a specific operation of the illustrative embodiment.

Specific operations of the illustrative embodiment for generating integrated image data will be described with reference to FIGS. 14 through 17. FIG. 14 is a flowchart demonstrating a division mode in which the operator designates a head page indicative of a division between chapters. As shown, whether or not the operator has pressed the print key 34 on the operation panel 30 is determined (step S10). If the answer of the step S10 is positive (YES), whether or not the operator has selected the integrated copy mode is determined (step S11). If the answer of the step S11 is YES, whether or not the operator has input a page number indicative of a division between chapters is determined (step S12). At this instant, the operator may designate a desired page either in the pictures of FIGS. 11 through 13 or on a personal computer not shown. If the answer of any one of the steps S10 through S12 is negative (NO), the operation returns (Ret).

If the answer of the step S12 is YES, the number of images N to be integrated into a single page and image page (number) data indicative of a page (or number) that defines a division between chapters are obtained (step S13). These data are input by the operator.

The step S13 is followed by a step S14 for reading image data. In the case of copying operation, the step S14 corresponds to the transfer of the image data of the documents stacked on the ADF 1 to the image memory 66 (106 and 107). When the operator inputs a print command on a personal computer, image data will be written to the image memory 66 via an I/O (Input/Output) port 67 shown in FIG. 4. Further, when image data stored in the HD 75 are used, the image data will be written to the image memory 66.

After the step S14, the number of images L read, i.e., the number of groups of image data representative of documents to be processed is determined (step S15). Consequently, basic data necessary for executing an integration plus division mode are fully prepared. The step S15 is followed by a step S16 for arranging the images (layout).

Figure 15:
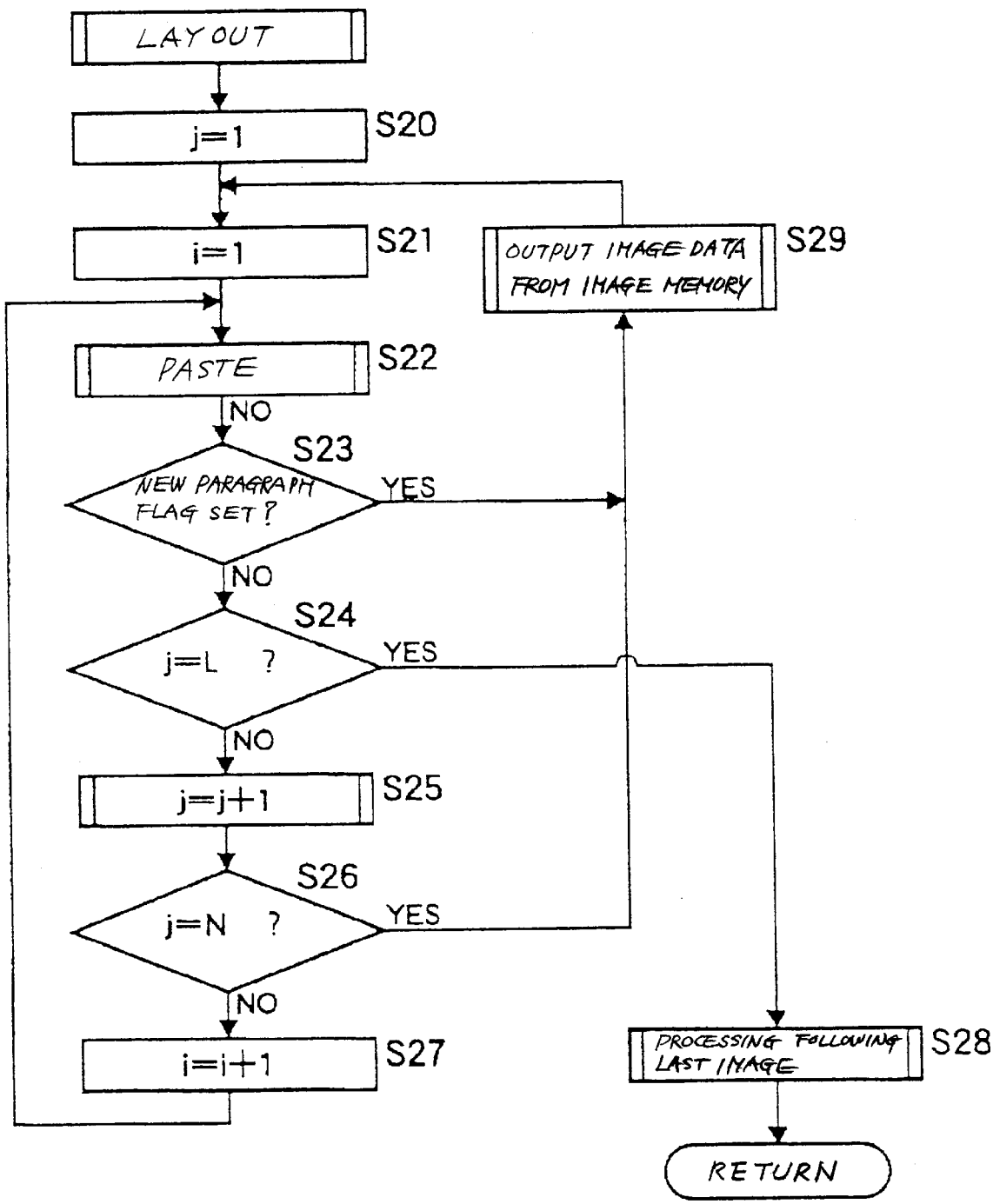

The step S16 is shown FIG. 15 in detail. In FIG. 15, a variable i is representative of the number of images having been laid out in a single page (1 through N when the number of images to be integrated is N). A variable j is representative of the number of images having been laid out (1 through L when the number of images read is L) or the total number of images when the images are arranged over a plurality of pages. A procedure shown in FIG. 15 is generally made up of monitor processing relating to all of the images (steps S20, S24, S25 and S28) and one-page layout processing relating to the image memory (steps S21, S26, S27 and S29).

The one-page layout processing pastes image data in the N subareas of the image memory corresponding to N images to be integrated (step S22). This step S22 will be described more specifically with reference to FIG. 16 later. After the step 20, whether or not all the image data have been fully processed, i.e., whether the number of images j integrated has reached L is determined (step S24). If the answer of the step S24 is YES, processing following the layout of the last image is executed (step S28). In this case, the writing of blank data or that of image data is not executed. If the answer of the step S24 is NO, the number of images j integrated is incremented by 1 (one) (step S25).

After the step S25, whether or not N images have been fully laid out in the one-page image memory, i.e., whether the number of images i laid out in a single page has reached N is determined (step S26). If the answer of the step S26 is NO, the number of images i is incremented by 1 (step S27). If the answer of the step S26 is YES, the current one page of image data are output from the image memory (step S29). In the case of copying, the one page of image data is used to produce an integrated copy.

Whether or not a new paragraph flag has been set is determined (step S23). The step S23 is executed in the pasting step (S22). The new paragraph flag indicates, when set, that image data are forcibly allotted to the next page. If the answer of the step S23 is YES, the current one-page of image data are output from the image memory (step S29) while the number i is initialized to "1" (step S21).

The procedure described so far pertains to a single copy. To produce a plurality of copies by sorting, one page of integrated image data output in the step S29 may be temporarily written to the HD 75 and repeatedly used to produce the second and successive copies.

Figure 16:
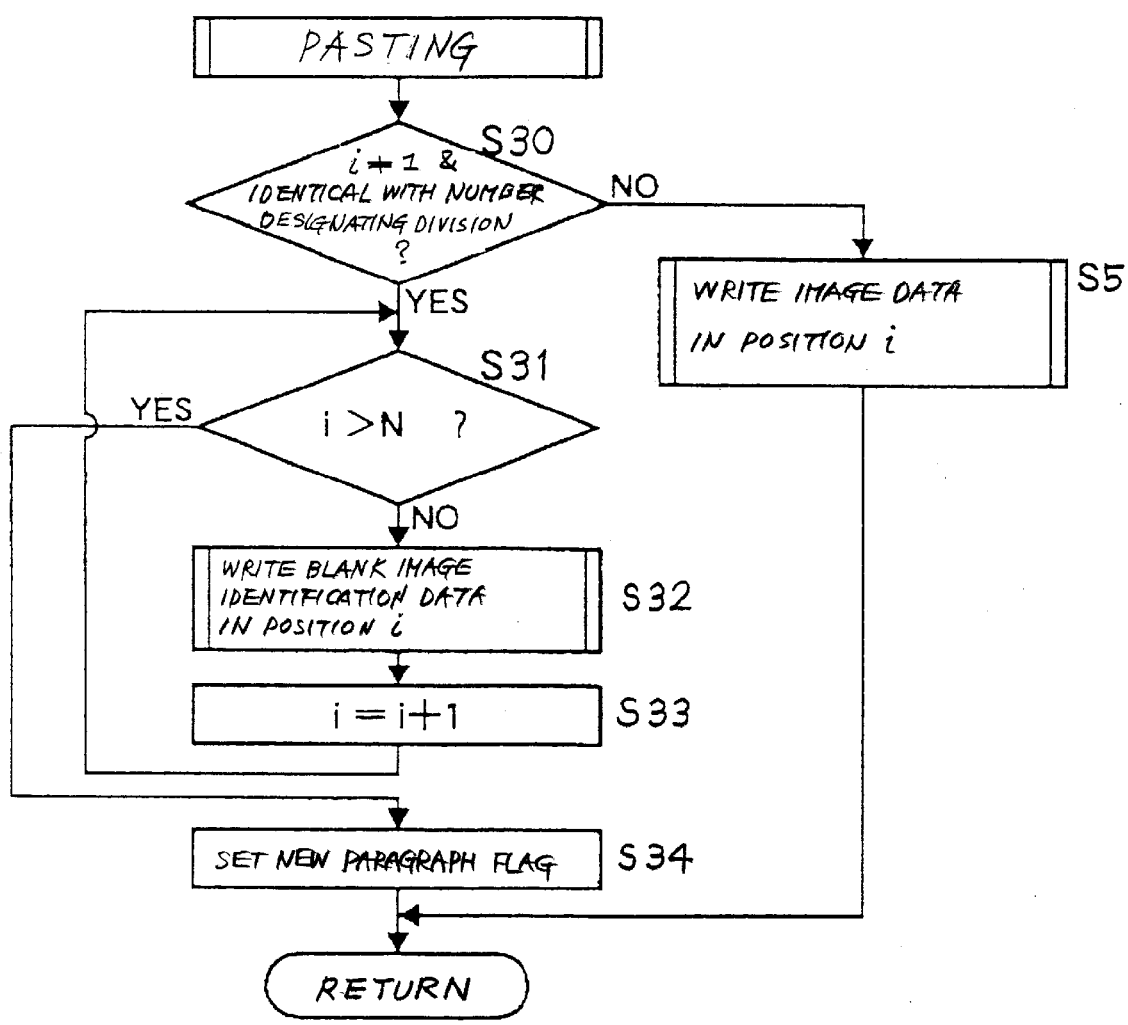

The pasting step S22 will be described more specifically with reference to FIG. 16. As shown, whether or not the image number, or the number of images laid out, j is identical with a number (page) indicative of a division between chapters, as designated by the operator, is determined (step S30). At this instant, the number of images integrated and laid out i should not be "1"; otherwise, a step S32 to be described later would be executed with the subarea N-1. If the answer of the step S30 is NO, image data with the image number j is written to the layout position i (step. S35).

If the answer of the step S30 is YES, whether or not the number of images i is greater than N is determined (step S31). If the answer of the step S31 is NO, blank image identification data representative of a blank subarea is written to the layout position i (step S32). After the step S32, the number i is incremented by 1 (step S33). The procedure then returns to the step S31. As a result, the blank image identification data is written to the rest of the subareas to the end of the page. When the number i exceeds the number N (YES, step S31), the new paragraph flag is set (step S34). This is the end of the pasting step.

The setting of the new paragraph flag (step S34, FIG. 16) is confirmed in the layout processing of FIG. 15 (step S23). After the confirmation, the image data with image numbers short of the number j are output from the image memory (step S29). The image data with the image number j is allotted to the head subarea of the next page because it is indicative of a division between chapters. Specifically, the number i is reset to "1" (step S21), and then the previously stated pasting step S22 is executed; that is, because the answer of the step S31, FIG. 16, is NO, the step S35 is executed.

Subsequently, the pasting processing is repeated with the image number j being sequentially incremented until the number j reaches the number L (step S24, FIG. 15). If the last document has been pasted (YES, step S24), the previously stated step S28 is executed. The step S28 allows the position of the last image to be accurately identified. More specifically, the step S28 makes the subarea or subareas after the last image simply blank and thereby indicates the absence of image data (e.g. end-of-document condition). This blank subarea must therefore be distinguished from the previously stated blank or imageless subarea indicative of a division between chapters in the integration mode.

Figure 17:
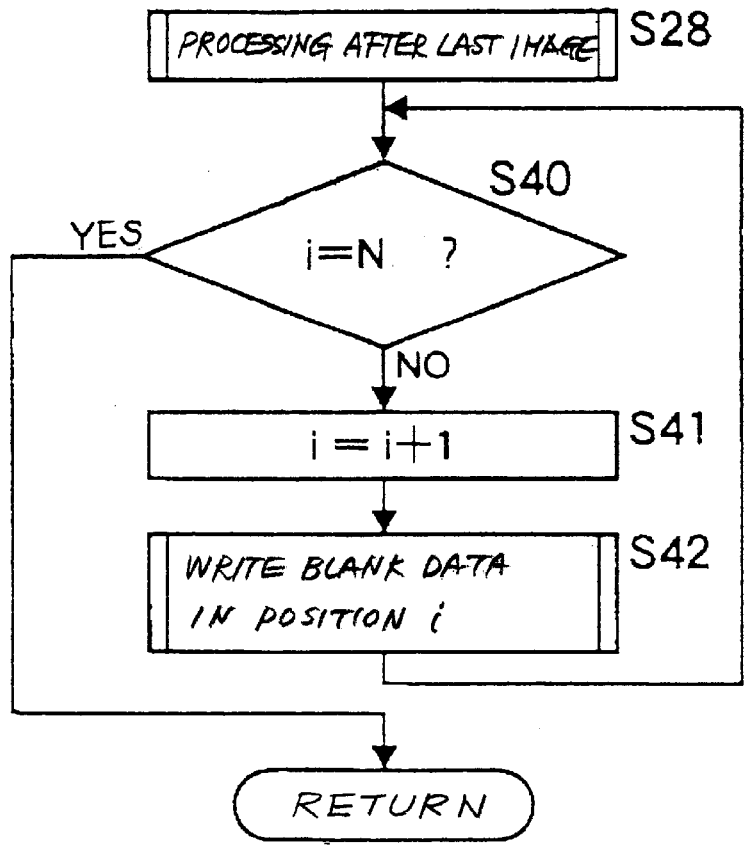

The step 28 is shown in FIG. 17 in detail. As shown, after the pasting of the last image (YES, step S24)., whether or not the number i is equal to N is determined (step S40). If the answer of the step S40 is YES, meaning that pasting has completed with all of the subareas, the procedure of FIG. 17 ends. If the answer of the step S40 is NO, the layout position i is incremented by 1 (step S41), and blank data is written to the new layout position i (step S42). This is repeated until i reaches N (YES, step S40). The resulting blank portion where no image data is present is significant for the above-described reason.

Figure 18:
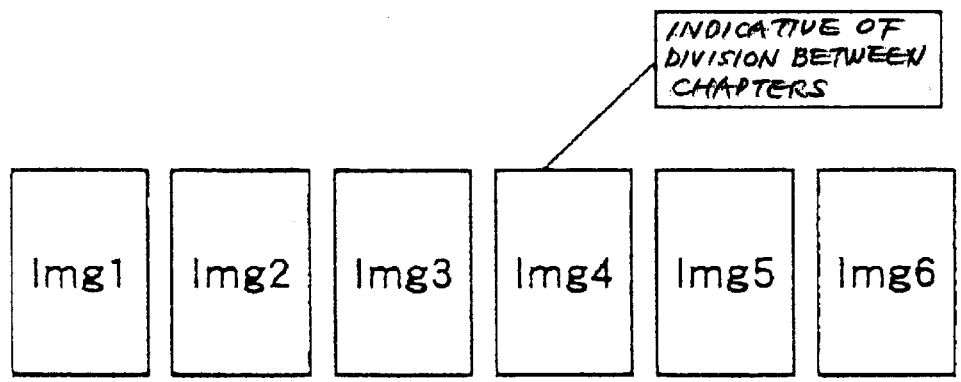
FIG. 18 is a view showing specific images Img1 through Img6 to be integrated together with the image Img4 indicating a division between chapters.

FIG. 18 shows six document images Img1 through Img6 to be integrated together with the image Img4 being representative of a division between chapters. FIG. 19 shows a specific layout of the images Img1 through Img6 integrated by a conventional scheme on the assumption that the number of images to be integrated into a single page is four. As shown, the images Img1 through Img6 are simply integrated on a four-image basis in accordance with the number; subareas after the last image are left blank.

FIG. 20 shows a specific layout of the integrated images Img1 through Img6 produced by the layout processing unique to the illustrative embodiment. As shown, the Img4 is allotted to the next page in order to indicate a division between chapters. Further, characters "BLANK", which is a specific form of the blank subarea identification data, are printed in the subarea next to the image Img3 of the first page, indicating the end of a chapter. Moreover, the last subarea of the second page is simply blank and shows that no image data is present there, i.e., that the image present in the subarea immediately preceding it is the last image. In this manner, the illustrative embodiment realizes the integrated copy plus division mode not available with the conventional schemes.

In summary, it will be seen that the present invention provides an image forming apparatus and an image processing apparatus including it that achieve various unprecedented advantages, as enumerated below.

(1) One of a plurality of original image information, which should be integrated together, is selected to be an image indicative of a division between chapters. The designated image is laid out in the particular image region of an integrated image page, so that a person can identify the division. Such page-by-page integrated image data implements the integrated copy plus division mode impracticable with the conventional schemes. That is, a division between chapters is easy to identify in an integrated image page. This obviates the troublesome search for a division in integrated images or the insertion of a blank document or dummy document and thereby enhances easy handling. By fixing the position on a paper sheet where the image data indicative of a division is arranged, a person can find an image indicative of the division simply by searching for the above position. This is particularly desirable when a large number of images are integrated on a single paper sheet.

(2) Only the image indicative of a division between chapters and successive images belonging to the same chapter are integrated in a single page. A person can therefore identify a division on a page basis. Particularly, when the designated image is arranged in the head region of a page, a division can be searched for more easily.

(3) When a division between chapters exists in images to be integrated, it may occur that the number of images n to be actually laid out on a single paper sheet is smaller than the maximum number of images N available with a single paper sheet. In such a case, image data allowing a person to see the absence of image data is inserted in the image region of an integrated image page where no image data is arranged. This is successful to prevent unexpected data to be printed in the above image region. Further, when extra image data representative of a blank region is printed, a person can readily see whether a blank document image has been mixed with expected document images or whether a blank region has been intentionally set to indicate a division between chapters.

(4) The image data allowing a person to see the absence of image data is inhibited from being inserted in a region occurring after the last image. This allows a person to distinguish such a region and the region representative of a division between chapters. It is therefore possible to accurately identify the position of the last image.

(5) The number of images to be integrated in a single page is specified beforehand, so that an integrated image with a division is formed in accordance with the specified number. This further enhances the applicability of an integrated image.

(6) The above-described advantages (1) through (5) are achievable with various kinds of image forming apparatuses including a copier, a printer, a facsimile apparatus, and an electronic file capable of integrating or otherwise editing a plurality of image data.

Various modifications will become possible for those skilled in the art after receiving the teachings of the present disclosure without departing from the scope thereof.

What is claimed is:

1. In an image forming apparatus including image data generating means for generating, based on a plurality of paginated original image information, integrated image data to be integrated into a single page, said image data generating means comprises:

division designating means for designating any one of images represented by said plurality of original image information as an image indicative of a division between chapters of said integrated image data to separate the integrated image data onto separate pages, wherein said image designated by said division designating means is arranged in a particular image region in an integrated image page.

2. An apparatus as claimed in claim 1, wherein said image data generating means arranges the image designated by said division designating means and successive pages, which are included in a same chapter, in a single page.

3. An apparatus as claimed in claim 2, wherein said image data generating means further comprises number specifying means for specifying a number of images to be integrated into a single page, wherein integrated images are laid out in accordance with the number of images designated.

4. An apparatus as claimed in claim 2, wherein said image data generating means inserts extra image data indicative of absence of the image data in an image region of an integrated image page in which no image data is laid out.

5. An apparatus as claimed in claim 4, wherein said image data generating means further comprises number specifying means for specifying a number of images to be integrated into a single page, wherein integrated images are laid out in accordance with the number of images designated.

6. An apparatus as claimed in claim 5, wherein said image data generating means inhibits, when the image region in which no image data is laid out occurs after a last image represented by the original image information, said extra image data from being inserted in said image region.

7. An apparatus as claimed in claim 6, wherein said image data generating means further comprises number specifying means for specifying a number of images to be integrated into a single page, wherein integrated images are laid out in accordance with the number of images designated.

8. An apparatus in accordance with claim 2, wherein said image data generating means arranges the image designated by said division designating means at a head image region of an integrated image page.

9. An apparatus as claimed in claim 8, wherein said image data generating means further comprises number specifying means for specifying a number of images to be integrated into a single page, wherein integrated images are laid out in accordance with the number of images designated.

10. An apparatus as claimed in claim 8, wherein said image data generating means inserts extra image data indicative of absence of the image data in an image region of an integrated image page in which no image data is laid out.

11. An apparatus as claimed in claim 10, wherein said image data generating means further comprises number specifying means for specifying a number of images to be integrated into a single page, wherein integrated images are laid out in accordance with the number of images designated.

12. An apparatus as claimed in claim 10, wherein said image data generating means inhibits, when the image region in which no image data is laid out occurs after a last image represented by the original image information, said extra image data from being inserted in said image region.

13. An apparatus as claimed in claim 12, wherein said image data generating means further comprises number specifying means for specifying a number of images to be integrated into a single page, wherein integrated images are laid out in accordance with the number of images designated.

14. An apparatus as claimed in claim 1, wherein said image data generating means inserts extra image data indicative of absence of the image data in an image region of an integrated image page in which no image data is laid out.

15. An apparatus as claimed in claim 14, wherein said image data generating means further comprises number specifying means for specifying a number of images to be integrated into a single page, wherein integrated images are laid out in accordance with the number of images designated.

16. An apparatus as claimed in claim 14, wherein said image data generating means inhibits, when the image region in which no image data is laid out occurs after a last image represented by the original image information, said extra image data from being inserted in said image region.

17. An apparatus as claimed in claim 16, wherein said image data generating means further comprises number specifying means for specifying a number of images to be integrated into a single page, wherein integrated images are laid out in accordance with the number of images designated.

18. An apparatus as claimed in claim 1, wherein said image data generating means further comprises number specifying means for specifying a number of images to be integrated into a single page, wherein integrated images are laid out in accordance with the number of images designated.

19. In an image forming apparatus including an image data generating device configured to generate, based on a plurality of paginated original image information, integrated image data to be integrated into a single page, said image data generating device comprises:

a division designating section configured to designate any one of images represented by said plurality of original image information as an image indicative of a division between chapters of said integrated image data to separate the integrated image data onto separate pages, wherein said image designated by said division designating section is arranged in a particular image region in an integrated image page.

20. An apparatus as claimed in claim 19, wherein said image data generating device arranges the image designated by said division designating section and successive pages, which are included in a same chapter, in a single page.

21. An apparatus in accordance with claim 20, wherein said image data generating device arranges the image designated by said division designating section at a head image region of an integrated image page.

22. An apparatus as claimed in claim 21, wherein said image data generating device inserts extra image data indicative of absence of the image data in an image region of an integrated image page in which no image data is laid out.

23. An apparatus as claimed in claim 22, wherein said image data generating device inhibits, when the image region in which no image data is laid out occurs after a last image represented by the original image information, said extra image data from being inserted in said image region.

24. An apparatus as claimed in claim 23, wherein said image data generating device further comprises.

a number specifying section configured to specify a number of images to be integrated into a single page, wherein integrated images are laid out in accordance with the number of images designated.

25. An image processing apparatus comprising:

inputting means for inputting a plurality of paginated original image information; and an image forming apparatus including image data generating means for generating, based on the plurality of original image information, integrated image data to be integrated into a single page;

said image data generating means comprising, division designating means for designating any one of images represented by the plurality of original image information as an image indicative of a division between chapters of said integrated image data to separate the integrated image data onto separate pages, wherein said image designated by said division designating means is arranged in a particular image region in an integrated image page.

26. An apparatus as claimed in claim 25, wherein said image data generating means arranges the image designated by said division designating means and successive pages, which are included in a same chapter, in a single page.

27. An apparatus in accordance with claim 26, wherein said image data generating means arranges the image designated by said division designating means at a head image region of an integrated image page.

28. An apparatus as claimed in claim 27, wherein said image data generating means inserts extra image data indicative of absence of the image data in an image region of an integrated image page in which no image data is laid out.

29. An apparatus as claimed in claim 28, wherein said image data generating means inhibits, when the image region in which no image data is laid out occurs after a last image represented by the original image information, said extra image data from being inserted in said image region.

30. An apparatus as claimed in claim 29, wherein said image data generating means further comprises number specifying means for specifying a number of images to be integrated into a single page, wherein integrated images are laid out in accordance with the number of images designated.

31. An image processing apparatus comprising:

an inputting device configured to input a plurality of paginated original image information; and an image forming apparatus including an image data generating device configured to generate, based on the plurality of original image information, integrated image data to be integrated into a single page;

said image data generating device comprising a division designating section designating configured to designate any one of images represented by the plurality of original image information as an image indicative of a division between chapters of said integrated image data to separate the integrated image data onto separate pages, wherein said image designated by said division designating section is arranged in a particular image region in an integrated image page.

32. An apparatus as claimed in claim 31, wherein said image data generating device arranges the image designated by said division designating section and successive pages, which are included in a same chapter, in a single page.

33. An apparatus in accordance with claim 32, wherein said image data generating device arranges the image designated by said division designating section at a head image region of an integrated image page.

34. An apparatus as claimed in claim 33, wherein said image data generating device inserts extra image data indicative of absence of the image data in an image region of an integrated image page in which no image data is laid out.

35. An apparatus as claimed in claim 34, wherein said image data generating device inhibits, when the image region in which no image data is laid out occurs after a last image represented by the original image information, said extra image data from being inserted in said image region.

36. An apparatus as claimed in claim 35, wherein said image data generating device further comprises:

a number specifying section configured to specify a number of images to be integrated into a single page, wherein integrated images are laid out in accordance with the number of images designated.

* * * * *